(12) United States Patent
Jimichi et al.

(10) Patent No.: US 11,855,445 B2
(45) Date of Patent: Dec. 26, 2023

(54) POWER CONVERSION DEVICE

(71) Applicant: Mitsubishi Electric Corporation, Tokyo (JP)

(72) Inventors: Takushi Jimichi, Tokyo (JP); Takaharu Ishibashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 132 days.

(21) Appl. No.: 17/599,586

(22) PCT Filed: Jul. 11, 2019

(86) PCT No.: PCT/JP2019/027560
§ 371 (c)(1),
(2) Date: Sep. 29, 2021

(87) PCT Pub. No.: WO2021/005792
PCT Pub. Date: Jan. 14, 2021

(65) Prior Publication Data
US 2022/0181869 A1    Jun. 9, 2022

(51) Int. Cl.
*H02H 7/12*    (2006.01)
*H02H 3/087*    (2006.01)
(Continued)

(52) U.S. Cl.
CPC ........ *H02H 7/1257* (2013.01); *H02H 7/1213* (2013.01); *H02J 1/102* (2013.01);
(Continued)

(58) Field of Classification Search
CPC ........ H02J 1/102–12; H02J 3/36; H02J 3/381; H02J 2300/20–24; H02J 2300/28;
(Continued)

(56) References Cited

U.S. PATENT DOCUMENTS 5,027,264 A    6/1991    DeDoncker et al.
5,726,849 A *  3/1998    Nakamura ............. H02J 1/102
                                                  361/94
(Continued)

FOREIGN PATENT DOCUMENTS

JP    2004-229407 A    8/2004
JP    2006-271069 A    10/2006
(Continued)

OTHER PUBLICATIONS

Kim, S. et al., "DC current suppression circuit in HVDC power transmission system," 2014 16th European Conference on Power Electronics and Applications, Lappeenranta, Finland, 2014, pp. 1-10, doi: 10.1109/EPE.2014.6910960. (Year: 2014).*

(Continued)

*Primary Examiner* — Fred E Finch, III
(74) *Attorney, Agent, or Firm* — XSENSUS LLP

(57) ABSTRACT

Even when one power conversion device among a plurality of power conversion devices connected in parallel experiences a short circuit, the other power conversion devices having experienced no short circuit can be promptly restarted. Each power conversion device includes: a short circuit occurrence determination unit configured to determine, on the basis of a current value at an output terminal, whether or not a short circuit has occurred; a short circuit elimination determination unit configured to determine, on the basis of a current value and a voltage value at the output terminal, whether or not the short circuit has been eliminated; and a current interruption unit configured to, on the basis of determination by the short circuit occurrence determination unit and determination by the short circuit elimination determination unit, interrupt current that flows from a power conversion unit to the output terminal or cancel the interruption.

6 Claims, 9 Drawing Sheets

(51) Int. Cl.
*H02J 1/10* (2006.01)
*H02H 7/125* (2006.01)
*H02H 3/06* (2006.01)
*H02M 1/00* (2006.01)

(52) U.S. Cl.
CPC ............ *H02H 3/063* (2013.01); *H02H 3/087* (2013.01); *H02M 1/0077* (2021.05)

(58) Field of Classification Search
CPC ...... H02H 3/063; H02H 3/087; H02H 7/1203; H02H 7/1213; H02H 7/125–127; H02M 1/0009; H02M 1/007; H02M 1/32; H02M 3/156; H02M 3/33573; H02M 3/3372; H02M 3/3376; H02M 7/219
See application file for complete search history.

(56) References Cited

U.S. PATENT DOCUMENTS

| | | | |
|---|---|---|---|
| 2002/0135328 A1* | 9/2002 | Hanaoka | H02M 5/4585 318/37 |
| 2003/0141856 A1 | 7/2003 | Kimura | |
| 2010/0026265 A1 | 2/2010 | Kuno et al. | |
| 2015/0222110 A1* | 8/2015 | Sidapara | H02H 7/1213 361/93.7 |
| 2016/0257202 A1 | 9/2016 | Chatroux et al. | |
| 2017/0063283 A1* | 3/2017 | Hirayama | H02P 27/06 |
| 2017/0126010 A1 | 5/2017 | Canales et al. | |
| 2018/0026450 A1* | 1/2018 | Moriyama | H02M 3/1584 307/51 |
| 2018/0254695 A1 | 9/2018 | Igarashi et al. | |
| 2019/0207533 A1* | 7/2019 | Kikuchi | H02M 7/49 |
| 2020/0395758 A1* | 12/2020 | Tanaka | H02P 27/06 |

FOREIGN PATENT DOCUMENTS

| | | |
|---|---|---|
| JP | 2010-39703 A | 2/2010 |
| JP | 2016-537960 A | 12/2016 |
| WO | 2017/038742 A1 | 3/2017 |

OTHER PUBLICATIONS

Negari, S. et al., "A new solid-state HVDC circuit breaker topology for offshore wind farms," 2014 IEEE 5th International Symposium on Power Electronics for Distributed Generation Systems (PEDG), Galway, Ireland, 2014, pp. 1-5, doi: 10.1109/PEDG.2014.6878653. (Year: 2014).*

European Search Report dated Jun. 10, 2022 in European Patent Application No. 19936920.8

International Search Report and Written Opinion dated Sep. 24, 2019, received for PCT Application PCT/JP2019/027560, Filed on Jul. 11, 2019, 11 pages including English Translation.

European Office Action dated Jul. 1, 2023 in corresponding European Patent Application No. 19 936 920.8, 5 pages.

* cited by examiner

POWER CONVERSION DEVICE

CROSS-REFERENCE TO RELATED APPLICATION

The present application is based on PCT filing PCT/JP2019/027560, filed Jul. 11, 2019, the entire contents of which are incorporated herein by reference.

TECHNICAL FIELD

The present disclosure relates to a power conversion device.

BACKGROUND ART

There have been known power conversion devices such as: AC-DC conversion devices for converting AC input power into DC power and outputting the DC power; and DC-DC conversion devices for converting a DC input power into a DC power at a different voltage and outputting the DC power. In such power conversion devices, if an output terminal is short-circuited for some reason, excessive short-circuit current flows. The excessive short-circuit current causes failure of the power conversion device.

As a power conversion device capable of preventing short-circuit current from flowing, there is a power conversion device including a short-circuit current interruption unit that is composed of a semiconductor switching element and a diode. In this power conversion device, if the value of output current exceeds a preset threshold value, the semiconductor switching element of the short-circuit current interruption unit is turned off so that short-circuit current is interrupted (see, for example, Patent Document 1).

CITATION LIST

Patent Document

Patent Document 1: Japanese Laid-open Patent Publication (translation of PCT application) No. 2016-537960

SUMMARY OF THE INVENTION

Problems to be Solved by the Invention

Wind power generation systems, photovoltaic power generation systems, or the like have a plurality of windmills or a plurality of solar cell modules connected in parallel. In such a system, DC power is transmitted, and sub DC lines are in parallel to one another and connected to a main DC line serving as a main route for power transmission. The windmills or the solar cell modules are disposed on the sub DC lines. A power conversion device for converting power generated by each windmill or each solar cell module into DC power suitable for power transmission, is connected to the corresponding sub DC line.

If one power conversion device among a plurality of the power conversion devices connected in parallel experiences a short circuit, excessive current flows from the other power conversion devices having experienced no short circuit into the power conversion device having experienced the short circuit. This current is called sneak current. In the case of using conventional power conversion devices including short-circuit current interruption units, in a power conversion device thereamong having experienced a short circuit, the short-circuit current interruption unit thereof is operated so that short-circuit current can be interrupted. However, also in the other power conversion devices having experienced no short circuit, the short-circuit current interruption units thereof are operated in response to excessive sneak currents so that current routes are disconnected. As a result, the other power conversion devices having experienced no short circuit are also stopped, and thus a problem arises in that the entire system is stopped for a long time.

The present disclosure has been made to solve the above problem. In the present disclosure, even when one power conversion device among a plurality of power conversion devices connected in parallel experiences a short circuit, the other power conversion devices having experienced no short circuit can be promptly restarted.

Solution to the Problems

A power conversion device according to the present disclosure includes: a power conversion unit configured to convert input power into DC power; an output terminal from which the DC power obtained through conversion by the power conversion unit is outputted; a short circuit occurrence determination unit configured to determine, on the basis of a current value at the output terminal, whether or not a short circuit has occurred at the output terminal; a short circuit elimination determination unit configured to determine, on the basis of a current value and a voltage value at the output terminal, whether or not the short circuit at the output terminal has been eliminated; and a current interruption unit provided between the power conversion unit and the output terminal, the current interruption unit being configured to interrupt current that flows from the power conversion unit to the output terminal, if the short circuit occurrence determination unit determines that a short circuit has occurred at the output terminal, and cancel the interruption of current that flows from the power conversion unit to the output terminal, if the short circuit elimination determination unit determines that the short circuit at the output terminal has been eliminated.

Effect of the Invention

The power conversion device according to the present disclosure includes the short circuit elimination determination unit configured to determine whether or not the short circuit at the output terminal has been eliminated. Thus, even when one power conversion device among a plurality of the power conversion devices connected in parallel experiences a short circuit, the other power conversion devices having experienced no short circuit can be promptly restarted.

DESCRIPTION OF EMBODIMENTS

Figure 1:
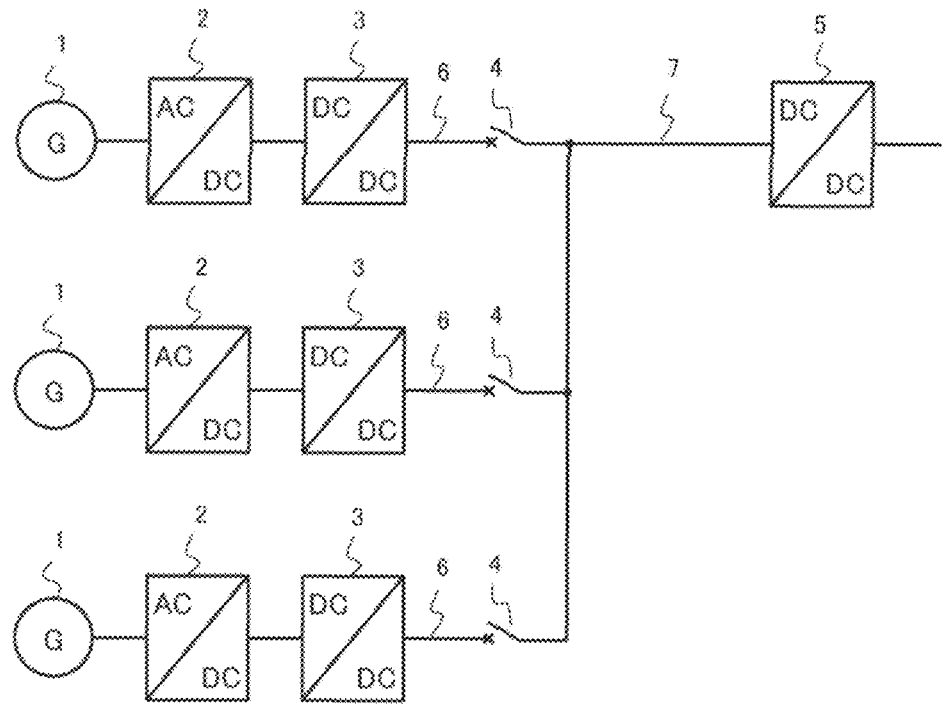
FIG. 1 is a configuration diagram of a wind power generation system according to embodiment 1.

Hereinafter, power conversion devices according to embodiments for carrying out the present disclosure will be described in detail with reference to the drawings. The same or corresponding portions in the drawings are denoted by the same reference characters.

Embodiment 1

FIG. 1 is a configuration diagram of a wind power generation system as an example of a system to which a power conversion device according to embodiment 1 is applied. This example is a wind power generation system having three windmills connected in parallel. It is noted that the wind power generation system may have four or more windmills connected in parallel. In the wind power generation system, AC power generated by a generator 1 in each windmill is converted into DC power by a corresponding AC-DC conversion device 2, and then the DC power is inputted to a corresponding power conversion device 3 of the present embodiment. The power conversion device 3 is a DC-DC conversion device. It is noted that the AC-DC conversion device 2 has a function of converting AC input power into DC power and outputting the DC power. Meanwhile, the DC-DC conversion device has a function of converting a DC input power into a DC power at a different voltage and outputting the DC power.

A plurality of the power conversion devices 3 are in parallel to one another and connected to a main DC line 7 via respective sub DC lines 6. As shown in FIG. 1, each sub DC line 6 may be provided with a circuit breaker 4. The main DC line 7 is connected to a separate power grid via a large-capacity power conversion device 5. It is noted that, as the system to which the power conversion device of the present embodiment is applied, there are a photovoltaic power generation system, a DC power distribution system that distributes DC power, and the like in addition to the wind power generation system.

Figure 2:
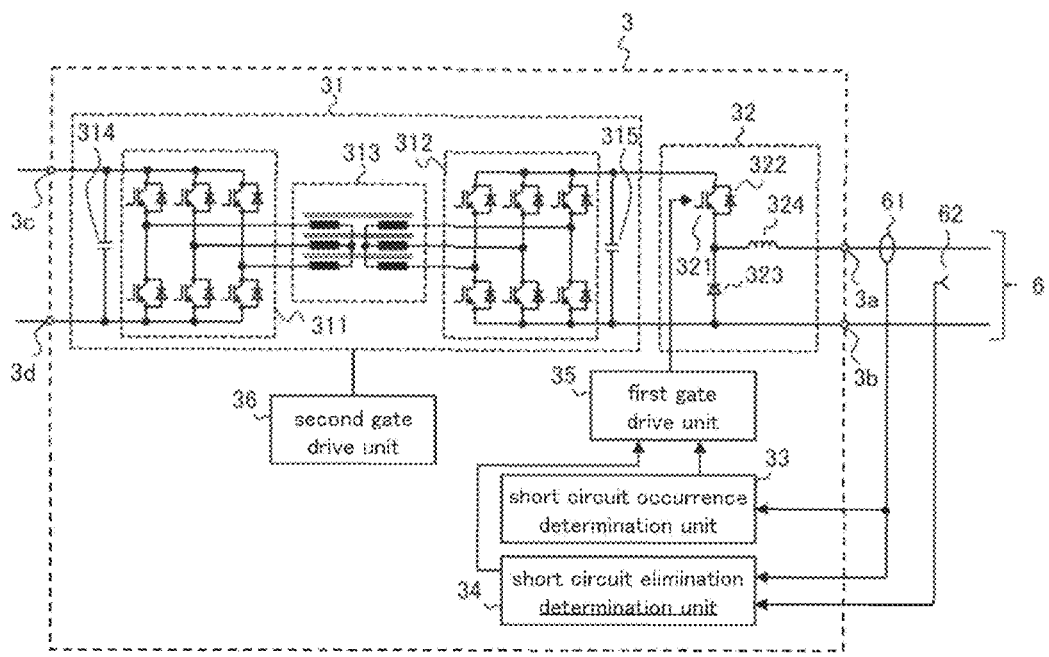
FIG. 2 is a configuration diagram of a power conversion device according to embodiment 1.

FIG. 2 is a configuration diagram of each power conversion device 3 according to the present embodiment. The power conversion device 3 of the present embodiment includes: a DC-DC conversion unit 31; an output terminal 3a from which the DC power obtained through conversion by the DC-DC conversion unit 31 is outputted to the corresponding sub DC line 6; a current interruption unit 32 provided between the DC-DC conversion unit 31 and the output terminal 3a and having a function of interrupting current that flows from the DC-DC conversion unit 31 to the output terminal 3a; a short circuit occurrence determination unit 33 which determines, on the basis of a current value at the sub DC line 6, whether or not a short circuit has occurred at the output terminal 3a; a short circuit elimination determination unit 34 which determines, on the basis of a current value and a voltage value at the sub DC line 6, whether or not the short circuit at the output terminal 3a has been eliminated; and a first gate drive unit 35 which drives a semiconductor switching element of the current interruption unit 32. It is noted that an output terminal 3b is a terminal at a reference potential for DC power to be outputted to the output terminal 3a.

The DC-DC conversion unit 31 includes: a first three-phase bridge circuit 311 which converts DC power inputted to a pair of input terminals 3c and 3d into AC power; and a second three-phase bridge circuit 312 which converts, into DC power, the AC power obtained through conversion by the first three-phase bridge circuit 311. The first three-phase bridge circuit 311 and the second three-phase bridge circuit 312 are connected to each other via a transformation circuit 313. A capacitor 314 and a capacitor 315 are respectively connected to the input side of the first three-phase bridge circuit 311 and the output side of the second three-phase bridge circuit 312. The power conversion device 3 further includes a second gate drive unit 36 which drives switching elements in the first three-phase bridge circuit 311 and the second three-phase bridge circuit 312 of the DC-DC conversion unit 31.

The current interruption unit 32 includes: a semiconductor switching element 321; a diode 322 connected in antiparallel to the semiconductor switching element 321; and a flyback diode 323 connected in series to the semiconductor switching element 321. Further, an inductance element 324 is connected to a connection point between the semiconductor switching element 321 and the flyback diode 323. As the semiconductor switching element 321, for example, an insulated-gate bipolar transistor (IGBT), a gate commutated turn-off thyristor (GCT), a metal-oxide-semiconductor field-effect transistor (MOSFET), or the like can be used. The semiconductor switching element 321 of the current interruption unit 32 is constantly kept in an ON state during a normal operation (during power conversion) of the power conversion device 3. Thus, current constantly flows in the semiconductor switching element 321 during a normal operation. Therefore, a unipolar element such as MOSFET in which voltage drop is small, is suitable as the semiconductor switching element 321. It is noted that, since the current interruption unit 32 is configured with the semiconductor switching element, a switching operation is performed at high speed as compared to the case where the current interruption unit 32 is configured with a mechanical switch.

In addition, since the current interruption unit 32 includes the flyback diode 323, current that flows to the inductance element 324 side can be caused to flow back to the flyback diode 323 side when the semiconductor switching element 321 is turned off. As a result, surge voltage to be applied to both ends of the semiconductor switching element 321 is suppressed, and reliability can be improved. Further, since the current interruption unit 32 includes the inductance element 324, increase in short-circuit current that flows until the semiconductor switching element 321 is set to be turned off, can be made moderate. Thus, the short-circuit current can be assuredly interrupted.

The sub DC line 6 on the output side of the power conversion device 3 is provided with: a current sensor 61 which detects a current at the sub DC line 6; and a voltage sensor 62 which detects a voltage at the sub DC line 6. Specifically, the current value detected by the current sensor 61 is a current value at the output terminal 3a, and the voltage value detected by the voltage sensor 62 is a voltage value at the output terminal 3a. The current sensor 61 outputs the detected current value to the short circuit occurrence determination unit 33 and the short circuit elimination determination unit 34. The voltage sensor 62 outputs the detected voltage value to the short circuit elimination determination unit 34.

The short circuit occurrence determination unit 33 determines, on the basis of the information from the current sensor 61, whether or not a short circuit has occurred at the output terminal 3a. Then, if the short circuit occurrence determination unit 33 determines that a short circuit has occurred, the short circuit occurrence determination unit 33 turns off the semiconductor switching element 321 of the current interruption unit 32 via the first gate drive unit 35. By turning off the semiconductor switching element 321 of the current interruption unit 32, current that flows from the DC-DC conversion unit 31 to the output terminal 3a is interrupted. In other words, the power conversion device 3 is stopped.

The short circuit occurrence determination unit 33 determines that a short circuit has occurred, if the current value detected by the current sensor 61 exceeds a preset overcurrent setting value. The overcurrent setting value is set to a value that is larger than a rated current value of the DC-DC conversion unit 31 and smaller than a maximum current value of a reverse bias safe operating area (RBSOA) of the semiconductor switching element 321. By setting the overcurrent setting value to a value that is smaller than the maximum current value of the reverse bias safe operating area, failure of the semiconductor switching element 321 can be prevented.

The short circuit elimination determination unit 34 determines, on the basis of the information from the current sensor 61 and the information from the voltage sensor 62, whether or not the short circuit at the output terminal 3a has been eliminated. Then, if the short circuit elimination determination unit 34 determines that the short circuit at the output terminal 3a has been eliminated, the short circuit elimination determination unit 34 turns on the semiconductor switching element 321 of the current interruption unit 32 via the first gate drive unit 35. By turning on the semiconductor switching element 321 of the current interruption unit 32, the interruption of current that flows from the DC-DC conversion unit 31 to the output terminal 3a is canceled. It is noted that the phrase "the interruption of current is canceled" means that routes for current are connected to each other. By canceling the interruption of current at the current interruption unit 32, the DC power obtained through conversion by the DC-DC conversion unit 31 is outputted to the sub DC line 6. In other words, the power conversion device 3 is restarted.

The short circuit elimination determination unit 34 determines that the short-circuited state has been canceled, if the current value detected by the current sensor 61 is smaller than a preset first current value and the voltage value detected by the voltage sensor 62 is larger than a preset first voltage value.

The first current value that is set in the short circuit elimination determination unit 34 is set to be, for example, 10% of a rated current value of the sub DC line 6. Meanwhile, the first voltage value that is set in the short circuit elimination determination unit 34 is set to be, for example, 80% of a rated voltage value of the sub DC line 6. By setting to the above values, determination as to whether or not the short-circuited state has been canceled can be promptly made.

Next, operations of the power conversion device 3 of the present embodiment will be described.

Figure 3:
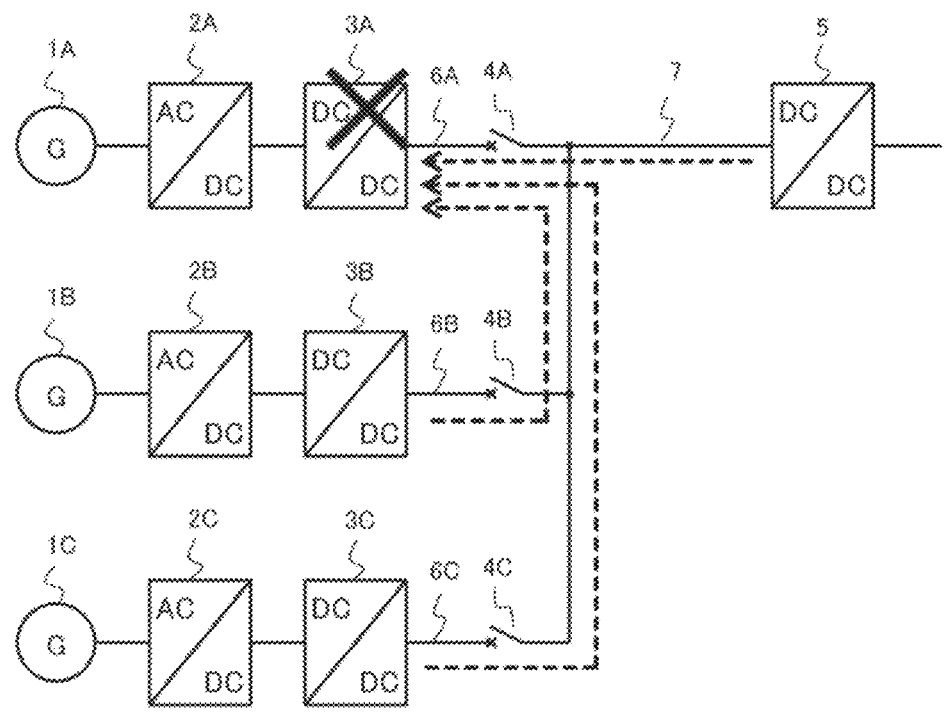
FIG. 3 is a diagram for explaining sneak currents in the wind power generation system according to embodiment 1.

FIG. 3 is a diagram for explaining sneak currents in a wind power generation system according to the present embodiment. This example is a wind power generation system having three windmills connected in parallel in the same manner as in FIG. 1. AC-DC conversion devices 2A, 2B, and 2C are respectively connected in series to generators 1A, 1B, and 1C in the windmills, and power conversion devices 3A, 3B, and 3C of the present embodiment are also respectively connected in series to the generators 1A, 1B, and 1C. Outputs of the power conversion devices 3A, 3B, and 3C are respectively connected to sub DC lines 6A, 6B, and 6C. The sub DC lines 6A, 6B, and 6C are respectively provided with circuit breakers 4A, 4B, and 4C. The sub DC lines 6A, 6B, and 6C are in parallel to one another and connected to the main DC line 7. The main DC line 7 is connected to a separate power grid via the large-capacity power conversion device 5.

It is assumed that, as shown in FIG. 3, the power conversion device 3A has failed and experienced a short circuit. When the power conversion device 3A experiences a short circuit, excessive short-circuit currents (sneak currents) flow from the large-capacity power conversion device 5 and the other power conversion devices 3B and 3C toward the power conversion device 3A. In FIG. 3, the broken arrows indicate the sneak currents. In addition, the flows of the excessive sneak currents lead also to reduction in voltages of the main DC line 7 and the sub DC lines 6A, 6B, and 6C. Since the only device that has failed is the power conversion device 3A, opening of the circuit breaker 4A makes it possible to electrically separate the power conversion device 3A having experienced the short circuit from the main DC line 7. However, sneak currents flow from the power conversion devices 3B and 3C into the power conversion device 3A during a time from a time point immediately after the power conversion device 3A has experienced the short circuit to a time point at which the circuit breaker 4A is opened. At this time, the short circuit occurrence determination units 33 of the power conversion devices 3B and 3C determine that the sneak currents flowing through the sub DC lines 6B and 6C are short-circuit currents, and turn off the semiconductor switching elements 321 of the current interruption units 32. Consequently, the sneak currents flowing through the sub DC lines 6B and 6C are interrupted at the current interruption units 32, and thus the circuit breakers 4B and 4C provided to the sub DC lines 6B and 6C are not opened. However, the interruption causes each of the power conversion devices 3B and 3C to be in a stopped state.

After the power conversion device 3A is electrically separated from the main DC line 7 by opening the circuit breaker 4A, currents and voltages at the main DC line 7 and the sub DC lines 6B and 6C are restored. That is, the current value at the main DC line 7 and the current values at the sub DC lines 6B and 6C are returned to normal-state current values smaller than the values of short-circuit currents, and the voltage value at the main DC line 7 and the voltage values at the sub DC lines 6B and 6C are returned to normal-state voltage values. At this time, the short circuit elimination determination units 34 of the power conversion devices 3B and 3C determine that the short-circuited states of the sub DC lines 6B and 6C have been canceled, and turn on the semiconductor switching elements 321 of the current interruption units 32 via the first gate drive units 35. As a result, the power conversion devices 3B and 3C are promptly restarted, and power generated by each of the generators 1B and 1C can be transmitted to the main DC line 7. By using the power conversion devices of the present embodiment in this manner, the period during which power cannot be generated owing to short-circuit failure or the like (hereinafter, written as loss of the opportunity of power generation) can be reduced to minimum in the wind power generation system.

Meanwhile, a case where the power conversion devices 3B and 3C do not include any short circuit elimination determination units, is as follows. The power conversion devices 3B and 3C can interrupt sneak currents by means of the short circuit occurrence determination units. As a result, unnecessary opening of the circuit breakers 4B and 4C provided to the sub DC lines 6B and 6C can be prevented. However, in each of the power conversion devices 3B and 3C in which short-circuit currents have been interrupted, the semiconductor switching element of the current interruption unit is kept in an OFF state even though a normal operation can be performed. As a result, the power conversion devices 3B and 3C are not restarted, and thus power generated by each of the generators 1B and 1C cannot be transmitted to the main DC line 7. Therefore, the loss of the opportunity of power generation becomes large.

By using the power conversion devices including the short circuit elimination determination units as described above, even when one power conversion device among the plurality of power conversion devices connected in parallel experiences a short circuit, the other power conversion devices having experienced no short circuit can be promptly restarted.

Figure 4:
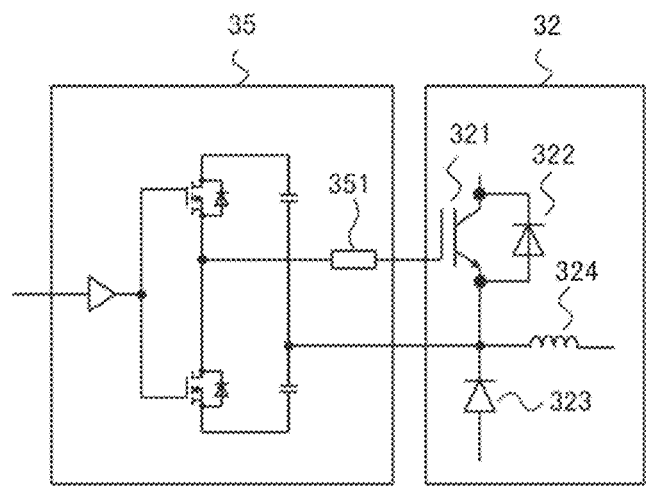
FIG. 4 is a configuration diagram of a first gate drive unit in embodiment 1.

FIG. 4 is a configuration diagram of the first gate drive unit 35. The first gate drive unit 35 receives signals from the short circuit occurrence determination unit 33 and the short circuit elimination determination unit 34. If the short circuit occurrence determination unit 33 determines that a short circuit has occurred, the first gate drive unit 35 receives an OFF signal. Meanwhile, if the short circuit elimination determination unit 34 determines that the short circuit has been eliminated, the first gate drive unit 35 receives an ON signal. As shown in FIG. 4, the semiconductor switching element 321 of the current interruption unit 32 is driven by the first gate drive unit 35. The semiconductor switching element 321 is constantly kept in an ON state during a normal operation (during power conversion). Thus, even if a gate resistance value 351 intrinsic to the first gate drive unit 35 is set to be large, increase in switching loss is not caused. Therefore, if the gate resistance value 351 intrinsic to the first gate drive unit 35 is set to be larger than a gate resistance value intrinsic to the second gate drive unit 36, surge voltage at the time of turning off can be suppressed, and reliability can be improved.

In the power conversion device of the present embodiment, the short circuit occurrence determination unit 33 determines, on the basis of a current value at the sub DC line 6 detected by the current sensor 61, whether or not a short circuit has occurred, and turns off the semiconductor switching element 321 of the current interruption unit 32 via the first gate drive unit 35. At this time, a delay occurs among the current sensor 61, the short circuit occurrence determination unit 33, the first gate drive unit 35, and the current interruption unit 32. Therefore, the semiconductor switching element 321 cannot be promptly turned off upon occurrence of a short circuit. The time from a time point at which the short circuit has occurred to a time point at which the semiconductor switching element 321 is turned off, is referred to as a delay time. Sneak current increases during the delay time. If the voltage at the sub DC line 6 is defined as V, the inductance value of the inductance element 324 of the current interruption unit 32 is defined as L, and the delay time is defined as T, the amount $\Delta I$ of increase in sneak current can be expressed with the following expression (1).

$$\Delta I = (V/L) \times T \quad (1)$$

If the overcurrent setting value that is set in the short circuit occurrence determination unit 33 is defined as Ioc and the maximum current value of the reverse bias safe operating area (RBSOA) of the semiconductor switching element 321 is defined as Imax, when the inductance value L of the inductance element 324 is set so as to satisfy the following expression (2), the semiconductor switching element 321 can be prevented from being damaged.

$$L \geq \{V/(Imax - Ioc)\} \times T \quad (2)$$

For example, if the voltage V at the sub DC line 6 is assumed to be 200V, the maximum current value Imax of the reverse bias safe operating area (RBSOA) of the semiconductor switching element 321 is assumed to be 800 A, the overcurrent setting value Ioc is assumed to be 600 A, and the delay time T is assumed to be 50 μs, the inductance value L of the inductance element 324 only has to be equal to or larger than 50 μH.

By using a power conversion device in which setting has been made as described above, the semiconductor switching element can be prevented from being damaged even when short-circuit current flows in the power conversion device.

It is noted that, although an example has been described in which each power conversion device of the present embodiment includes the three-phase bridge circuits for the power conversion unit, another power conversion unit may be used as long as the power conversion unit outputs DC power.

It is desirable that the overcurrent setting value that is set in the short circuit occurrence determination unit is set to a value that is smaller than a breaking current setting value of the circuit breaker provided to the sub DC line to which the power conversion device is connected. If the overcurrent setting value is set to a value that is smaller than the breaking current setting value of the circuit breaker, when sneak current flows, the current interruption unit is operated before the circuit breaker is operated. Thus, the sub DC line can be assuredly prevented from being disconnected by the circuit breaker.

Embodiment 2

Figure 5:
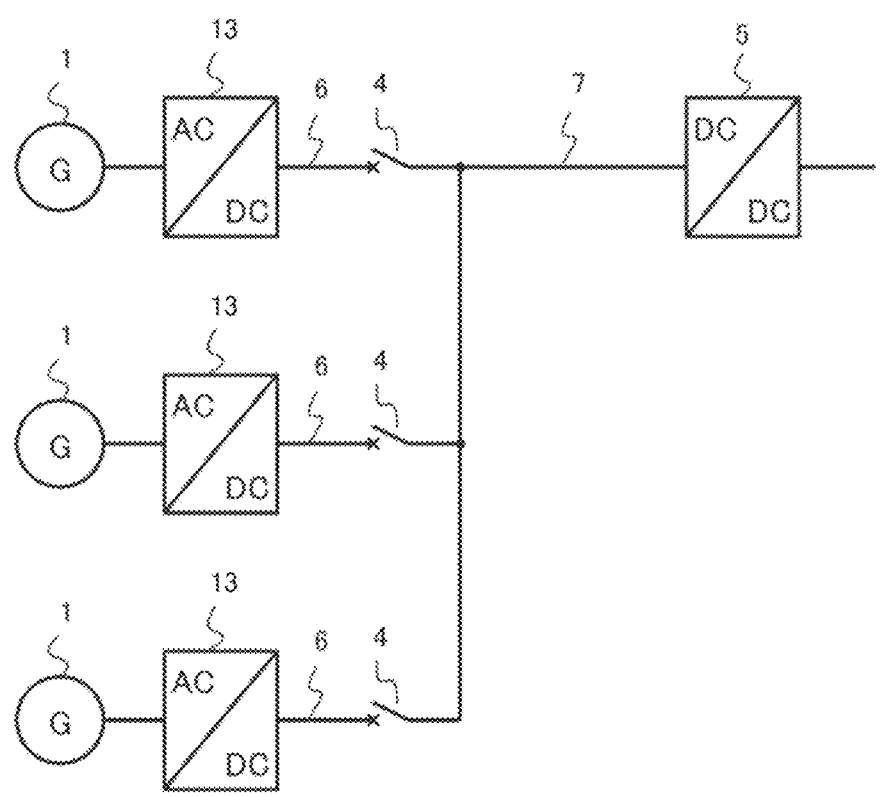
FIG. 5 is a configuration diagram of a wind power generation system according to embodiment 2.

FIG. 5 is a configuration diagram of a wind power generation system as an example of a system to which a power conversion device according to embodiment 2 is applied. This example is a wind power generation system having the three windmills connected in parallel. In the wind power generation system, AC power generated by each of the generators 1 in the windmills is inputted to a corresponding power conversion device 13 of the present embodiment. Each power conversion device 13 of the present embodiment is an AC-DC conversion device. The power conversion device 13 converts the AC power into DC power. The three power conversion devices 13 are in parallel to one another and connected to the main DC line 7 via the sub DC lines 6. As shown in FIG. 5, each sub DC line 6 may be provided with the corresponding circuit breaker 4. The main DC line 7 is connected to a separate power grid via the large-capacity power conversion device 5.

Figure 6:
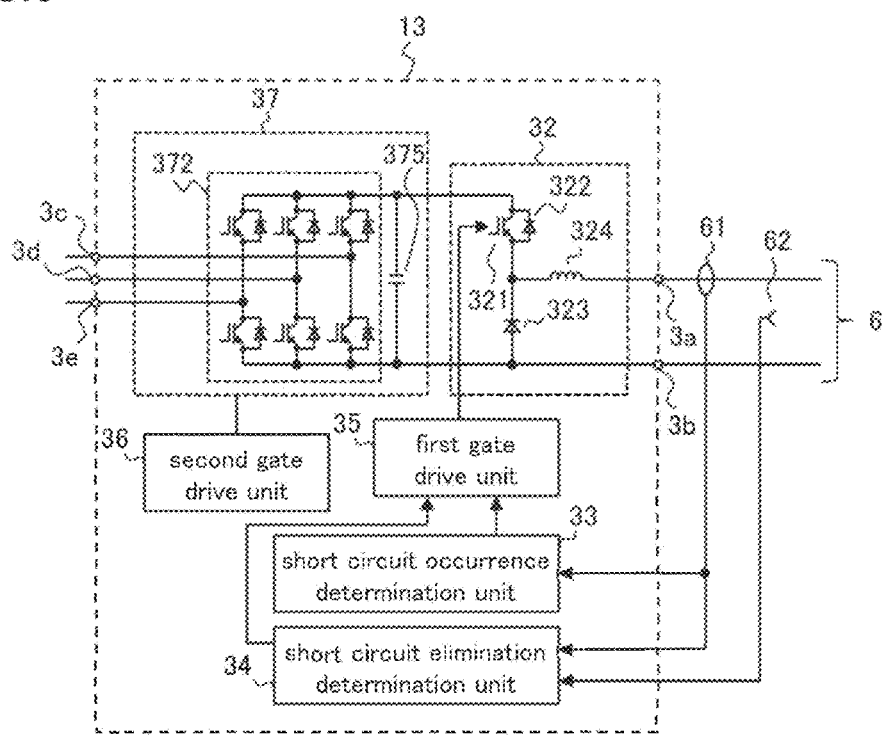
FIG. 6 is a configuration diagram of a power conversion device according to embodiment 2.

FIG. 6 is a configuration diagram of each power conversion device 13 according to the present embodiment. The power conversion device 13 of the present embodiment includes: an AC-DC conversion unit 37; the output terminal 3a from which the DC power obtained through conversion by the AC-DC conversion unit 37 is outputted to the corresponding sub DC line 6; the current interruption unit 32 provided between the AC-DC conversion unit 37 and the output terminal 3a and having a function of interrupting current that flows from the AC-DC conversion unit 37 to the output terminal 3a; the short circuit occurrence determination unit 33 which determines, on the basis of a current value at the sub DC line 6, whether or not a short circuit has occurred at the output terminal 3a; the short circuit elimination determination unit 34 which determines, on the basis of a current value and a voltage value at the sub DC line 6, whether or not the short circuit at the output terminal 3a has been eliminated; and the first gate drive unit 35 which drives the semiconductor switching element of the current interruption unit 32. It is noted that the output terminal 3b is a terminal at a reference potential for DC power to be outputted to the output terminal 3a.

The AC-DC conversion unit 37 includes a two-level three-phase bridge circuit 372 which converts, into DC power, three-phase AC power inputted to three input terminals 3c, 3d, and 3e. A capacitor 375 is connected to the output side of the three-phase bridge circuit 372. The power conversion device 13 further includes the second gate drive unit 36 which drives switching elements of the three-phase bridge circuit 372 of the AC-DC conversion unit 37.

The sub DC line 6 on the output side of the power conversion device 13 is provided with: the current sensor 61 which detects a current at the sub DC line 6; and the voltage sensor 62 which detects a voltage at the sub DC line 6. The current sensor 61 outputs the detected current value to the short circuit occurrence determination unit 33 and the short circuit elimination determination unit 34. The voltage sensor 62 outputs the detected voltage value to the short circuit elimination determination unit 34.

The short circuit occurrence determination unit 33 determines, on the basis of the information from the current sensor 61, whether or not a short circuit has occurred at the output terminal 3a. Then, if the short circuit occurrence determination unit 33 determines that a short circuit has occurred, the short circuit occurrence determination unit 33 turns off the semiconductor switching element 321 of the current interruption unit 32 via the first gate drive unit 35. By turning off the semiconductor switching element 321 of the current interruption unit 32, current that flows from the AC-DC conversion unit 37 to the output terminal 3a is interrupted. In other words, the power conversion device 13 is stopped.

The short circuit occurrence determination unit 33 determines that a short circuit has occurred, if the current value detected by the current sensor 61 exceeds a preset overcurrent setting value. The overcurrent setting value is set to a value that is larger than a rated current value of the AC-DC conversion unit 37 and smaller than the maximum current value of the reverse bias safe operating area (RBSOA) of the semiconductor switching element 321.

The short circuit elimination determination unit 34 determines, on the basis of the information from the current sensor 61 and the information from the voltage sensor 62, whether or not the short circuit at the output terminal 3a has been eliminated. Then, if the short circuit elimination determination unit 34 determines that the short circuit at the output terminal 3a has been eliminated, the short circuit elimination determination unit 34 turns on the semiconductor switching element 321 of the current interruption unit 32 via the first gate drive unit 35. By turning on the semiconductor switching element 321 of the current interruption unit 32, the interruption of current that flows from the AC-DC conversion unit 37 to the output terminal 3a is canceled. By canceling the interruption of current at the current interruption unit 32, the DC power obtained through conversion by the AC-DC conversion unit 37 is outputted to the sub DC line 6. In other words, the power conversion device 13 is restarted.

The short circuit elimination determination unit 34 determines that the short-circuited state has been canceled, if the current value detected by the current sensor 61 is smaller than a preset first current value and the voltage value detected by the voltage sensor 62 is larger than a preset first voltage value.

The first current value that is set in the short circuit elimination determination unit 34 is set to be, for example, 10% of the rated current value of the sub DC line 6. Meanwhile, the first voltage value that is set in the short circuit elimination determination unit 34 is set to be, for example, 80% of the rated voltage value of the sub DC line 6. By setting to the above values, determination as to whether or not the short-circuited state has been canceled can be promptly made.

Next, operations of the power conversion device 13 of the present embodiment will be described.

It is assumed that, as shown in FIG. 5, one power conversion device 13 among the three power conversion devices 13 connected in parallel has failed and experienced a short circuit. When the one power conversion device 13 experiences a short circuit, short-circuit currents (sneak currents) flow from the large-capacity power conversion device 5 and the other two power conversion devices 13 toward the power conversion device 13 having experienced the short circuit. The power conversion device 13 having experienced the short circuit includes the current interruption unit 32 and the short circuit occurrence determination unit 33, and thus can interrupt the short-circuit current. In addition, since short-circuit current flows from the large-capacity power conversion device 5 into the power conversion device 13 having experienced the short circuit, the circuit breaker 4 connected to the said power conversion device 13 is opened. The opening of the circuit breaker 4 leads to electrical separation of the power conversion device 13 having experienced the short circuit from the main DC line 7. However, sneak currents flow from the other two power conversion devices into the one power conversion device during a time from a time point immediately after the one power conversion device has experienced the short circuit to a time point at which the circuit breaker 4 is opened. At this time, the short circuit occurrence determination units 33 of the other two power conversion devices determine that the sneak currents flowing through the sub DC lines 6 are short-circuit currents, and turn off the semiconductor switching elements 321 of the current interruption units 32. Therefore, the other two power conversion devices having experienced no short circuit are each in a stopped state.

After the power conversion device 13 having experienced the short circuit is electrically separated from the main DC line 7 by opening the circuit breaker 4, currents and voltages at the main DC line 7 and the sub DC lines 6 are restored. The short circuit elimination determination units 34 of the other two power conversion devices determine that the short circuits at the output terminals 3a have been eliminated, and turn on the semiconductor switching elements 321 of the current interruption units 32 via the first gate drive units 35. As a result, the other two power conversion devices are promptly restarted, and power generated by each of the generators can be transmitted to the main DC line 7. By using the power conversion devices of the present embodiment in this manner, the loss of the opportunity of power generation due to short-circuit failure or the like can be reduced to minimum in the wind power generation system.

By using such power conversion devices, even when one power conversion device among a plurality of the power conversion devices connected in parallel experiences a short circuit, the other power conversion devices having experienced no short circuit can be promptly restarted.

It is noted that, if the inductance value L of the inductance element 324 of the current interruption unit 32 is set so as to satisfy expression (2), the semiconductor switching element 321 can be prevented from being damaged, in the same manner as in embodiment 1.

In addition, if the gate resistance value intrinsic to the first gate drive unit 35 is set to be larger than the gate resistance value intrinsic to the second gate drive unit 36, surge voltage at the time of turning off can be suppressed and reliability can be improved, in the same manner as in embodiment 1.

Embodiment 3

Figure 7:
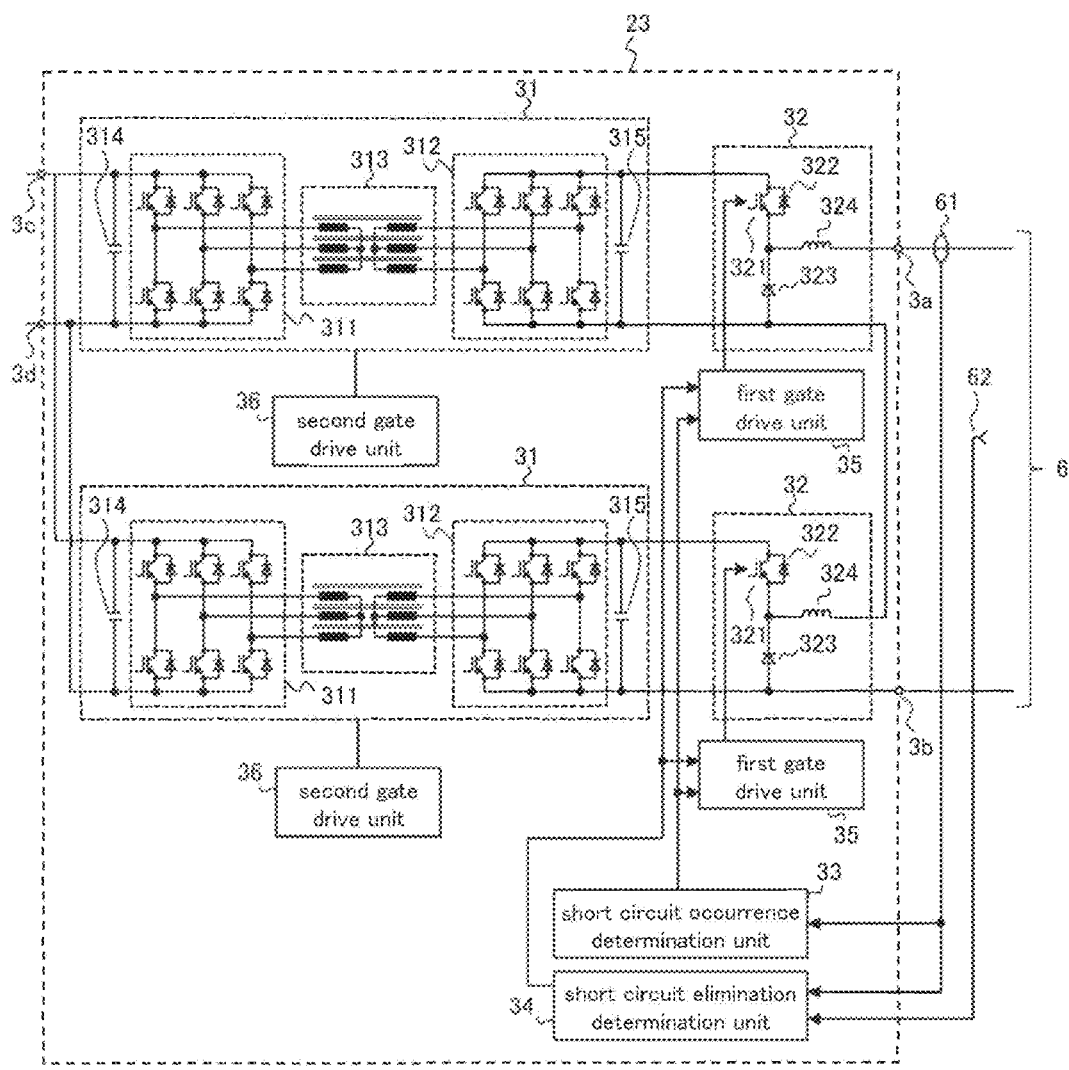
FIG. 7 is a configuration diagram of a power conversion device according to embodiment 3.

FIG. 7 is a configuration diagram of a power conversion device 23 according to embodiment 3. The power conversion device 23 of the present embodiment is a power conversion device used for a wind power generation system or the like, as the power conversion device shown in FIG. 1 for embodiment 1 is. The power conversion device 23 of the present embodiment is a DC-DC conversion device, as the power conversion device of embodiment 1 is. In the power conversion device 23 of the present embodiment, two DC-DC conversion units 31 and two current interruption units 32 are connected in series for the purpose of increasing output voltage. First gate drive units 35 are respectively connected to the two current interruption units 32. In addition, second gate drive units 36 are respectively connected to the two DC-DC conversion units 31. The power conversion device 23 of the present embodiment further includes: the short circuit occurrence determination unit 33 which determines, on the basis of a current value at the sub DC line 6, whether or not a short circuit has occurred at the output terminal 3a; and the short circuit elimination determination unit 34 which determines, on the basis of a current value and a voltage value at the sub DC line 6, whether or not the short circuit at the output terminal 3a has been eliminated. In the power conversion device 23 of the present embodiment, the configurations of each DC-DC conversion unit 31, each current interruption unit 32, the short circuit occurrence determination unit 33, the short circuit elimination determination unit 34, each first gate drive unit 35, and each second gate drive unit 36 are the same as those in embodiment 1. It is noted that, although the two DC-DC conversion units 31 and the two current interruption units 32 are connected in series in the power conversion device shown in FIG. 7, three or more DC-DC conversion units and three or more current interruption units may be connected in series.

The sub DC line 6 on the output side of the power conversion device 23 is provided with: the current sensor 61 which detects a current at the sub DC line 6; and the voltage sensor 62 which detects a voltage at the sub DC line 6. The current sensor 61 outputs the detected current value to the short circuit occurrence determination unit 33 and the short circuit elimination determination unit 34. The voltage sensor 62 outputs the detected voltage value to the short circuit elimination determination unit 34.

The short circuit occurrence determination unit 33 determines, on the basis of the information from the current sensor 61, whether or not a short circuit has occurred at the output terminal 3a. Then, if the short circuit occurrence determination unit 33 determines that a short circuit has occurred, the short circuit occurrence determination unit 33 turns off semiconductor switching elements 321 of the two current interruption units 32 via the first gate drive units 35. By turning off the semiconductor switching elements 321 of the current interruption units 32, currents that flow from the two DC-DC conversion units 31 to the output terminal 3a are interrupted. In other words, the power conversion device 23 is stopped.

The short circuit occurrence determination unit 33 determines that a short circuit has occurred, if the current value detected by the current sensor 61 exceeds a preset overcurrent setting value. The overcurrent setting value is set to a value that is larger than rated current values of the DC-DC conversion units 31 and smaller than maximum current values of reverse bias safe operating areas (RBSOAs) of the semiconductor switching elements 321.

The short circuit elimination determination unit 34 determines, on the basis of the information from the current sensor 61 and the information from the voltage sensor 62, whether or not the short circuit at the output terminal 3a has been eliminated. Then, if the short circuit elimination determination unit 34 determines that the short circuit at the output terminal 3a has been eliminated, the short circuit elimination determination unit 34 turns on the semiconductor switching elements 321 of the two current interruption units 32 via the first gate drive units 35. By turning on the semiconductor switching elements 321 of the current interruption units 32, the interruption of currents that flow from the two DC-DC conversion units 31 to the output terminal 3a is canceled. By canceling the interruption of currents at the two current interruption units 32, DC power obtained through conversion by each of the two DC-DC conversion units 31 is outputted to the sub DC line 6. In other words, the power conversion device 23 is restarted.

The short circuit elimination determination unit 34 determines that the short-circuited state has been canceled, if the current value detected by the current sensor 61 is smaller than a preset first current value and the voltage value detected by the voltage sensor 62 is larger than a preset first voltage value.

The first current value that is set in the short circuit elimination determination unit 34 is set to be, for example, 10% of the rated current value of the sub DC line 6. Meanwhile, the first voltage value that is set in the short circuit elimination determination unit 34 is set to be, for example, 80% of the rated voltage value of the sub DC line 6. By setting to the above values, determination as to whether or not the short-circuited state has been canceled can be promptly made.

By using such power conversion devices, even when one power conversion device among a plurality of the power conversion devices connected in parallel experiences a short circuit, the other power conversion devices having experienced no short circuit can be promptly restarted in the same manner as in embodiment 1.

Figure 8:
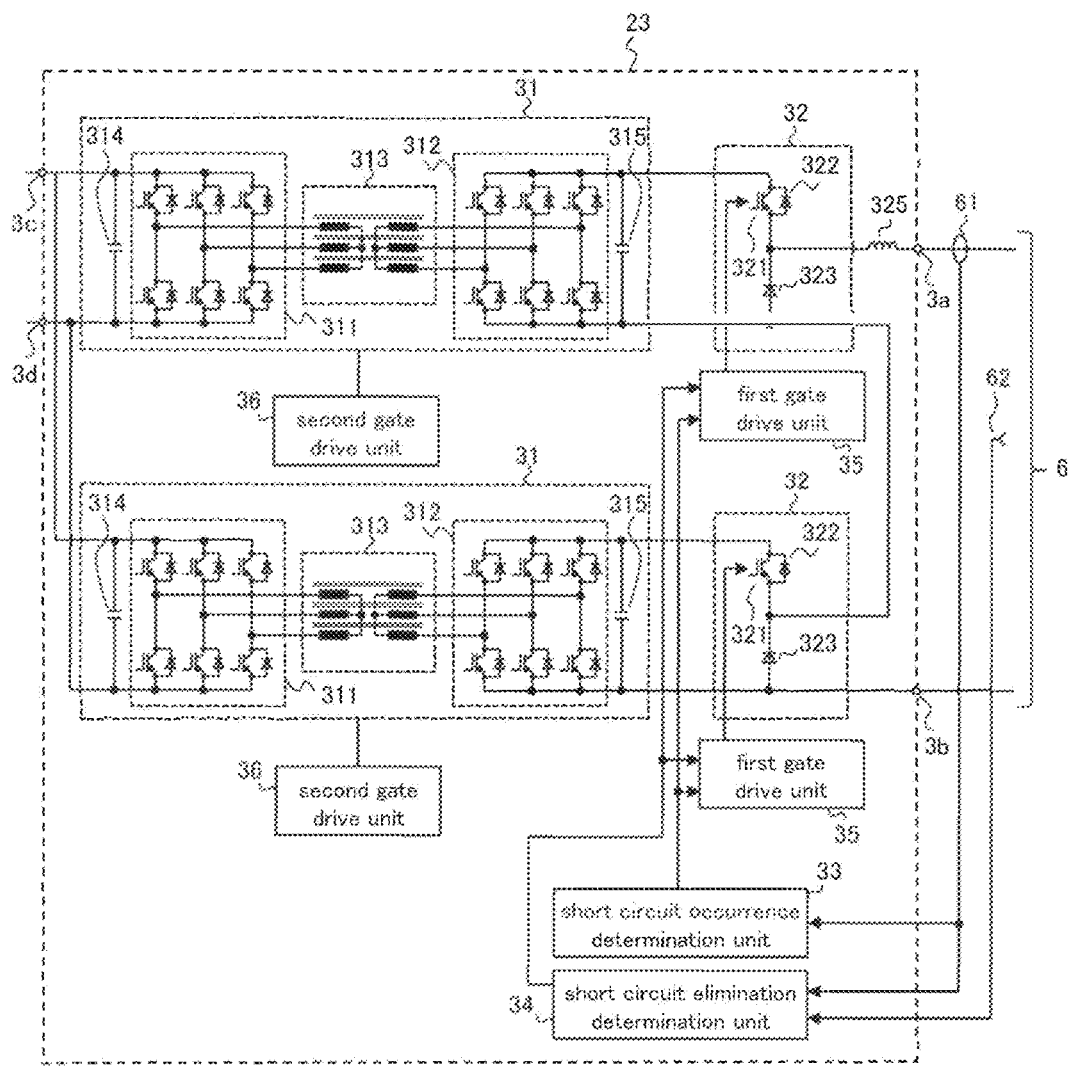
FIG. 8 is a configuration diagram of a power conversion device according to embodiment 3.

FIG. 8 is a configuration diagram of another power conversion device 23 according to the present embodiment. In the power conversion device 23 shown in FIG. 7, the two current interruption units 32 include respective inductance elements 324. The two inductance elements 324 are connected in series. Meanwhile, as shown in FIG. 8, one inductance element 325 may be provided, instead of the two inductance elements, between the output terminal 3a and the current interruption unit 32 that is located closer to the output terminal 3a. If the number of inductance elements is reduced in this manner, the size of the power conversion device is reduced. It is noted that the position of the one inductance element 325 may be any position on a current route connected to the output terminal 3a.

It is noted that, if the inductance value L of each of the two inductance elements 324 of the current interruption units 32 shown in FIG. 7 or the one inductance element 325 shown in FIG. 8 is set so as to satisfy expression (2), the semiconductor switching elements 321 can be prevented from being damaged, in the same manner as in embodiment 1.

Embodiment 4

Figure 9:
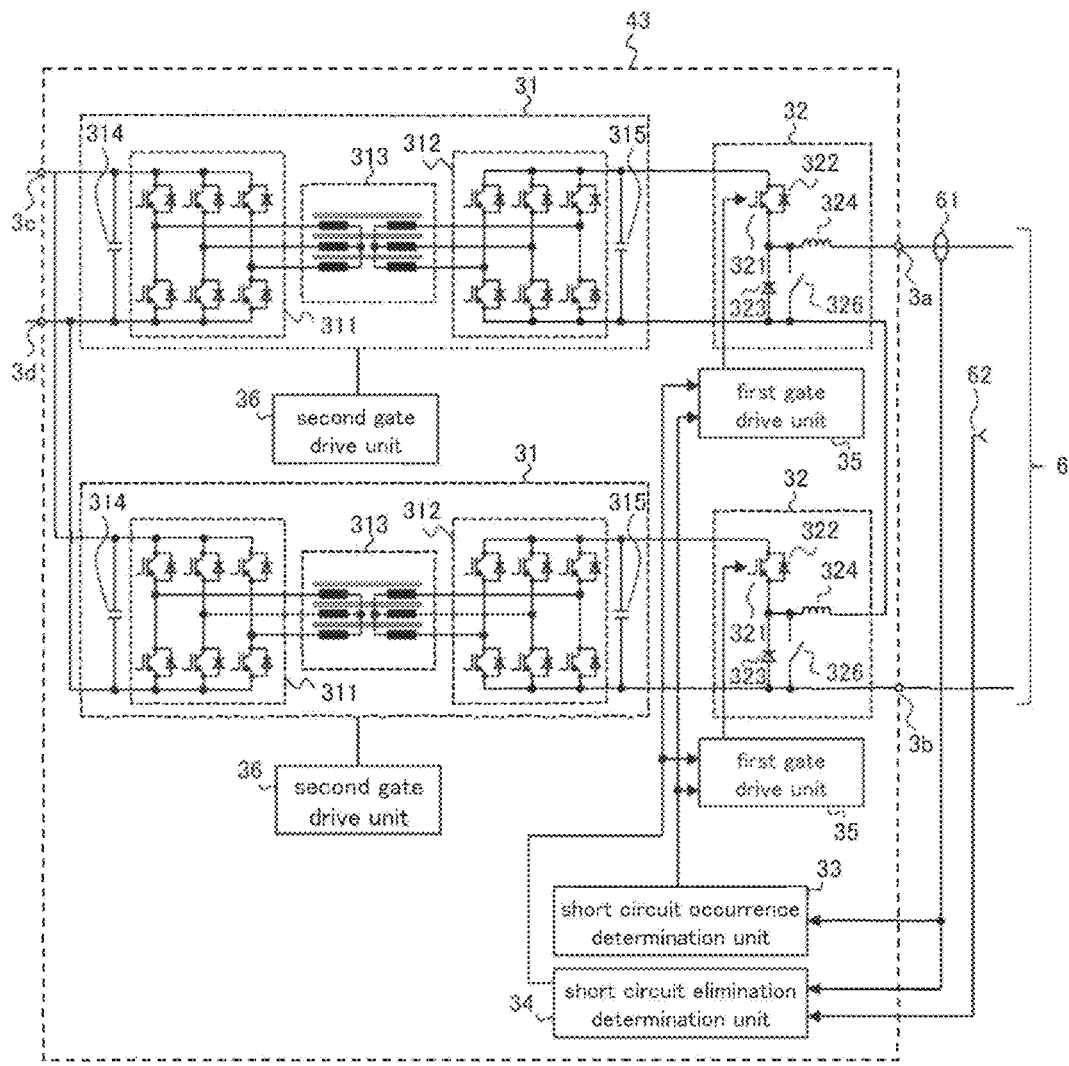
FIG. 9 is a configuration diagram of a power conversion device according to embodiment 4.

FIG. 9 is a configuration diagram of a power conversion device 43 according to embodiment 4. The power conversion device 43 of the present embodiment is a power conversion device used for a wind power generation system or the like, as the power conversion device shown in FIG. 1 for embodiment 1 is. The power conversion device 43 of the present embodiment is obtained by providing, in the power conversion device of embodiment 3, bypass switches 326 in parallel to the flyback diodes 323 of the current interruption units 32.

The bypass switches 326 are constantly kept in opened states during a normal operation (during power conversion) of the power conversion device 43. Each bypass switch 326 is closed upon detection of: a failure of the current interruption unit 32 including the said bypass switch 326; or a failure of the DC-DC conversion unit 31 connected to the input side of the said current interruption unit 32. By closing the bypass switch 326, a current route bypassing the failed DC-DC conversion unit 31 or the failed current interruption unit 32 is formed. Consequently, the operation of the power conversion device 43 can be continued with the other DC-DC conversion unit 31 and the other current interruption unit 32 capable of normal operations.

The sub DC line 6 on the output side of the power conversion device 43 is provided with: the current sensor 61 which detects a current at the sub DC line 6; and the voltage sensor 62 which detects a voltage at the sub DC line 6. The current sensor 61 outputs the detected current value to the short circuit occurrence determination unit 33 and the short circuit elimination determination unit 34. The voltage sensor 62 outputs the detected voltage value to the short circuit elimination determination unit 34.

The short circuit occurrence determination unit 33 determines, on the basis of the information from the current sensor 61, whether or not a short circuit has occurred at the output terminal 3a. Then, if the short circuit occurrence determination unit 33 determines that a short circuit has occurred, the short circuit occurrence determination unit 33 turns off the semiconductor switching elements 321 of the two current interruption units 32 via the first gate drive units 35. By turning off the semiconductor switching elements 321 of the current interruption units 32, currents that flow from the two DC-DC conversion units 31 to the output terminal 3a are interrupted. In other words, the power conversion device 43 is stopped.

The short circuit occurrence determination unit 33 determines that a short circuit has occurred, if the current value detected by the current sensor 61 exceeds a preset overcurrent setting value. The overcurrent setting value is set to a value that is larger than the rated current values of the DC-DC conversion units 31 and smaller than the maximum current values of the reverse bias safe operating areas (RBSOAs) of the semiconductor switching elements 321.

The short circuit elimination determination unit 34 determines, on the basis of the information from the current sensor 61 and the information from the voltage sensor 62, whether or not the short circuit at the output terminal 3a has been eliminated. Then, if the short circuit elimination determination unit 34 determines that the short circuit at the output terminal 3a has been eliminated, the short circuit elimination determination unit 34 turns on the semiconductor switching elements 321 of the two current interruption units 32 via the first gate drive units 35. By turning on the semiconductor switching elements 321 of the current interruption units 32, the interruption of currents that flow from the two DC-DC conversion units 31 to the output terminal 3a is canceled. By canceling the interruption of currents at the two current interruption units 32, DC power obtained through conversion by each of the two DC-DC conversion units 31 is outputted to the sub DC line 6. In other words, the power conversion device 43 is restarted.

The short circuit elimination determination unit 34 determines that the short-circuited state has been canceled, if the current value detected by the current sensor 61 is smaller than a preset first current value and the voltage value detected by the voltage sensor 62 is larger than a preset first voltage value.

The first current value that is set in the short circuit elimination determination unit 34 is set to be, for example, 10% of the rated current value of the sub DC line 6. Meanwhile, the first voltage value that is set in the short circuit elimination determination unit 34 is set to be, for example, 80% of the rated voltage value of the sub DC line 6. By setting to the above values, determination as to whether or not the short-circuited state has been canceled can be promptly made.

By using such power conversion devices, even when one power conversion device among a plurality of the power conversion devices connected in parallel experiences a short circuit, the other power conversion devices having experienced no short circuit can be promptly restarted in the same manner as in embodiment 3.

In addition, since each power conversion device of the present embodiment includes the bypass switches in parallel to the flyback diodes of the current interruption units, even if one of the DC-DC conversion units or one of the current interruption units fails, the operation can be continued with the other DC-DC conversion unit and the other current interruption unit capable of normal operations.

It is noted that, when either of the DC-DC conversion units 31 or either of the current interruption units 32 has failed, the corresponding bypass switch 326 is closed, and thus a mechanical switch that does not need any power in order to keep the closed state is desirable as the bypass switch 326. Further, the power conversion device of the present embodiment may be a power conversion device including the one inductance element 325 shown in FIG. 8 for embodiment 3.

Figure 10:
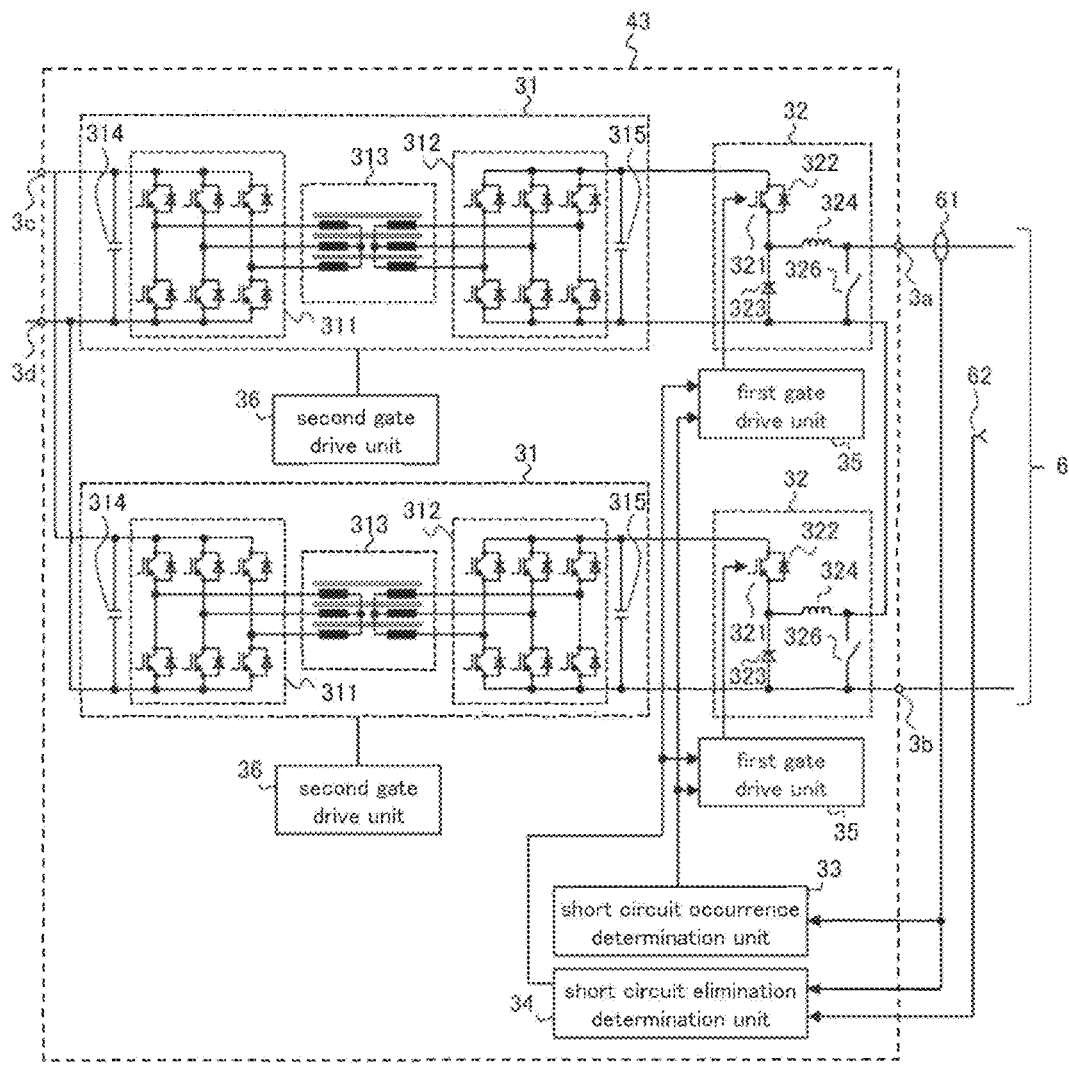
FIG. 10 is a configuration diagram of a power conversion device according to embodiment 4.

FIG. 10 is a configuration diagram of another power conversion device 43 according to the present embodiment. As shown in FIG. 10, the bypass switches 326 may be connected in parallel to the flyback diodes 323 with the inductance elements 324 interposed therebetween. In the power conversion device 43 having such a configuration, even if either of the bypass switches 326 is closed when the semiconductor switching element 321 of the corresponding current interruption unit 32 has failed in a short-circuited state, discharge current from the capacitor 315 of the corresponding DC-DC conversion unit 31 flows through the bypass switch 326 via the inductance element 324. Therefore, abrupt increase in the discharge current from the capacitor 315 can be inhibited.

Figure 11:
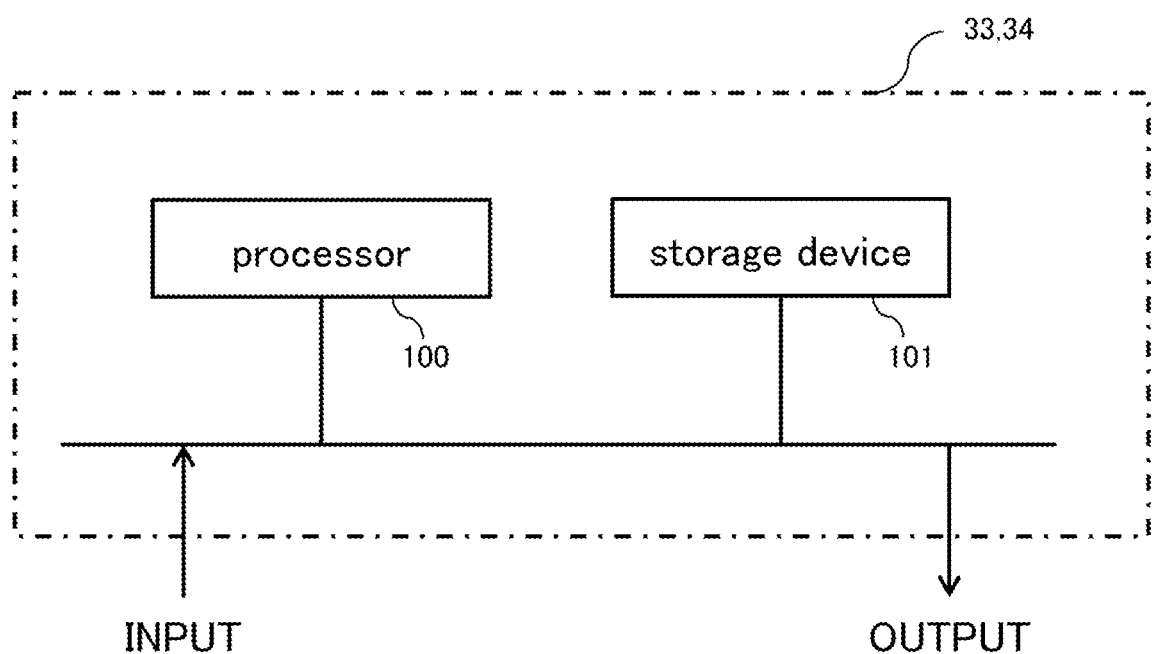
FIG. 11 is a schematic diagram showing an example of hardware of each of short circuit occurrence determination units and short circuit elimination determination units in embodiments 1 to 4.

It is noted that each of the short circuit occurrence determination units 33 and the short circuit elimination determination units 34 in the power conversion devices according to embodiments 1 to 4 may be composed of a processor 100 and a storage device 101 as shown in FIG. 11 which shows an example of hardware. Although not shown, the storage device 101 includes a volatile storage device such as a random access memory and a nonvolatile auxiliary storage device such as a flash memory. Alternatively, the storage device 101 may include, as the auxiliary storage device, a hard disk instead of a flash memory. The processor 100 executes a program inputted from the storage device 101. In this case, the program is inputted from the auxiliary storage device via the volatile storage device to the processor 100. In addition, the processor 100 may output data such as a calculation result to the volatile storage device of the storage device 101 or save the data to the auxiliary storage device via the volatile storage device.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1A, 1B, 1C generator
2, 2A, 2B, 2C AC-DC conversion device
3, 3A, 3B, 3C, 5, 13, 23, 43 power conversion device
3a, 3b output terminal
3c, 3d, 3e input terminal
4, 4A, 4B, 4C circuit breaker
6, 6A, 6B, 6C sub DC line
7 main DC line
31 DC-DC conversion unit
32 current interruption unit
33 short circuit occurrence determination unit
34 short circuit elimination determination unit
35 first gate drive unit
36 second gate drive unit
37 AC-DC conversion unit
61 current sensor
62 voltage sensor
100 processor
101 storage device
311 first three-phase bridge circuit
312 second three-phase bridge circuit
313 transformation circuit
314, 315, 375 capacitor
321 semiconductor switching element
322 diode
323 flyback diode
324, 325 inductance element
326 bypass switch
351 gate resistance value
372 three-phase bridge circuit

The invention claimed is:

1. A power conversion device comprising:
a power conversion circuitry to convert input power into DC power;
an output terminal from which the DC power obtained through conversion by the power conversion circuitry is outputted;
a short circuit occurrence determination circuitry to determine, on the basis of a current value at the output terminal, whether or not a short circuit has occurred at the output terminal;
a short circuit elimination determination circuitry to determine, on the basis of a current value and a voltage value at the output terminal, whether or not the short circuit at the output terminal has been eliminated; and
a current interruption circuitry is provided between the power conversion circuitry and the output terminal, the current interruption circuitry to
interrupt current that flows from the power conversion circuitry to the output terminal, if the short circuit occurrence determination circuitry determines that a short circuit has occurred at the output terminal, and
cancel the interruption of current that flows from the power conversion circuitry to the output terminal, if the short circuit elimination determination circuitry determines that the short circuit at the output terminal has been eliminated, wherein
the current interruption circuitry includes:
a semiconductor switching element;
a flyback diode connected in series to the semiconductor switching element; and
an inductance element connected to a connection point between the semiconductor switching element and the flyback diode, and
by turning off the semiconductor switching element, current that flows from the power conversion circuitry to the output terminal is interrupted,
the power conversion circuitry includes a three-phase bridge circuit,
the power conversion device further comprises
a first gate drive circuitry to drive the semiconductor switching element of the current interruption circuitry, and
a second gate drive circuitry to drive drives the three-phase bridge circuit of the power conversion circuitry, and
a gate resistance value of the first gate drive circuitry is larger than a gate resistance value of the second gate drive circuitry.

2. The power conversion device according to claim 1, wherein the short circuit elimination determination circuitry determines that the short circuit at the output terminal has been eliminated, if the current value at the output terminal is smaller than a preset value and the voltage value at the output terminal is larger than a preset value.

3. The power conversion device according to claim 1, wherein
the short circuit occurrence determination circuitry determines that a short circuit has occurred at the output terminal, if a current value of the DC power exceeds an overcurrent setting value, and the overcurrent setting value is set to a value that is larger than a rated current value of the power conversion circuitry and smaller than a maximum current value of a reverse bias safe operating area of the semiconductor switching element.

4. The power conversion device according to claim 1, comprising a plurality of the power conversion circuitry and a plurality of the current interruption circuitry, wherein
the plurality of the power conversion circuitry and the plurality of the current interruption circuitry are connected in series.

5. The power conversion device according to claim 4, wherein each current interruption circuitry includes a bypass switch connected in parallel to the flyback diode of the current interruption circuitry.

6. The power conversion device according to claim 1, wherein the semiconductor switching element is a unipolar element.

\* \* \* \* \*